(12) United States Patent
Lind et al.

(10) Patent No.: US 10,981,633 B2
(45) Date of Patent: Apr. 20, 2021

(54) ELECTRICALLY POWERED, WATER-JET PROPELLED SURFBOARD

(71) Applicant: Radinn AB, Malmö (SE)

(72) Inventors: Alexander Lind, Malmö (SE); Esbjörn Beckmann, Malmö (SE); Philip Sveningsson, Höllviken (SE)

(73) Assignee: Radinn AB, Malmö (SE)

( * ) Notice: Subject to any disclaimer, the term of this patent is extended or adjusted under 35 U.S.C. 154(b) by 0 days.

(21) Appl. No.: 16/478,698

(22) PCT Filed: Dec. 10, 2018

(86) PCT No.: PCT/SE2018/051262
§ 371 (c)(1),
(2) Date: Jul. 17, 2019

(87) PCT Pub. No.: WO2019/143276
PCT Pub. Date: Jul. 25, 2019

(65) Prior Publication Data
US 2020/0283102 A1  Sep. 10, 2020

(30) Foreign Application Priority Data

Jan. 19, 2018 (SE) .................................. 1850062-9

(51) Int. Cl.
*B63H 21/17* (2006.01)
*B63B 35/81* (2006.01)
(Continued)

(52) U.S. Cl.
CPC .............. *B63B 32/10* (2020.02); *B63B 32/40* (2020.02)

(58) Field of Classification Search
CPC ......... B63B 32/00; B63B 32/10; B63B 32/40; B63B 32/50; B63B 34/10; B63H 11/00;
(Continued)

(56) References Cited

U.S. PATENT DOCUMENTS

| 3,405,677 | A |   | 10/1968 | Smith |   |
|---|---|---|---|---|---|
| 6,142,840 | A | * | 11/2000 | Efthymiou | .............. B63B 32/10 440/6 |

(Continued)

FOREIGN PATENT DOCUMENTS

| JP | 2002-154479 A | 5/2002 |
|---|---|---|
| KR | 10-2004-0077611 A | 9/2004 |

(Continued)

OTHER PUBLICATIONS

Korean Office Action dated Apr. 25, 2020, issued in corresponding Korean Patent Application No. 10-2019-7015524 filed Dec. 10, 2018, 19 pages.

(Continued)

*Primary Examiner* — Daniel V Venne
(74) *Attorney, Agent, or Firm* — Christensen O'Connor Johnson Kindness PLLC

(57) ABSTRACT

A surfboard with a surfboard body (1) extending along a longitudinal direction (L) and having an upper surface and a bottom surface. An electrical battery pack (2) is removably positioned in an upper compartment accessible from the upper surface. An electrically driven water-jet configured to propel the surfboard is provided with electrical power from the electrical battery pack. The electrically driven water-jet is provided in a propulsion module (3) that is removably positioned in a lower compartment accessible from the lower surface. The upper compartment and the lower compartment partly overlaps each other as seen along the longitudinal direction (L).

16 Claims, 2 Drawing Sheets

(51) Int. Cl.
*B63B 32/10* (2020.01)
*B63B 32/40* (2020.01)

(58) Field of Classification Search
CPC .... B63H 2011/004; B63H 11/02; B63H 11/04
USPC ....... 441/65, 74, 79; 114/55.5, 55.54, 55.56, 114/55.58; 440/6, 38
See application file for complete search history.

(56) References Cited

U.S. PATENT DOCUMENTS

| | | |
|---|---|---|
| 6,311,631 B1 | 11/2001 | Beecher |
| 6,409,560 B1 * | 6/2002 | Austin .................... B63B 32/10 441/74 |
| 6,568,340 B2 * | 5/2003 | Dec ........................ B63B 32/10 114/55.56 |
| 6,702,634 B2 * | 3/2004 | Jung ....................... B63B 32/10 441/74 |
| 6,901,872 B1 * | 6/2005 | Battle .................... B63B 32/10 114/55.56 |
| 6,966,808 B1 * | 11/2005 | Liao ....................... B63B 32/10 441/74 |
| 7,226,329 B2 * | 6/2007 | Railey ................... B63B 32/10 441/74 |
| 7,731,555 B2 | 6/2010 | Railey |
| 7,993,178 B2 * | 8/2011 | Railey ................... B63H 21/17 441/74 |
| 8,851,947 B2 * | 10/2014 | Vlock .................... B63B 32/60 441/74 |
| 9,718,521 B2 * | 8/2017 | Derrah .................. B63H 11/04 |
| 10,035,570 B1 * | 7/2018 | Barron .................. B63H 21/17 |
| 2011/0201238 A1 | 8/2011 | Rott et al. |
| 2014/0134900 A1 | 5/2014 | Derrah |
| 2017/0297669 A1 | 10/2017 | Railey et al. |

FOREIGN PATENT DOCUMENTS

| | | |
|---|---|---|
| KR | 10-2015-0072180 A | 6/2015 |
| WO | 2016/061274 A1 | 4/2016 |
| WO | 2016/099406 A1 | 6/2016 |

OTHER PUBLICATIONS

International Search Report and Written Opinion dated Feb. 13, 2019, issued in corresponding International Application No. PCT/SE2018/051262, filed Dec. 10, 2018, 10 pages.

* cited by examiner

ELECTRICALLY POWERED, WATER-JET PROPELLED SURFBOARD

FIELD OF INVENTION

The invention relates to a surfboard, and especially to an electrically powered, water jet-propelled surfboard.

TECHNICAL BACKGROUND

US 2011/0201238 A1 discloses an electrically powered, water-jet propelled surfboard. However, the technical design makes it difficult to manufacture the board and install the propulsion system. It is also difficult to perform fault-finding and service.

U.S. Pat. No. 7,731,555 also discloses a powered surfboard. This surfboard is designed to preserve energy of surfer during paddling. Furthermore, the design of also this surfboard makes it difficult to manufacture the board and install the propulsion system. It is also difficult to perform fault-finding and service.

Thus, there exist a need for an improved electrically powered water-jet propelled surfboard addressing amongst others the above discussed problems with the prior art surfboards.

SUMMARY OF INVENTION

It is an object of the invention to provide an electrically powered water-jet propelled surfboard addressing amongst others the above discussed problems with the prior art surfboards.

This object has been achieved by a surfboard comprising
a surfboard body extending along a longitudinal direction and having an upper surface and a bottom surface,
an electrical battery pack being removably positioned in an upper compartment accessible from the upper surface, and
an electrically driven water-jet configured to propel the surfboard and being provided with electrical power from the electrical battery pack, wherein the electrically driven water-jet is provided in a propulsion module being removably positioned in a lower compartment accessible from the lower surface,
wherein the upper compartment and the lower compartment partly overlaps each other a distance as seen along the longitudinal direction.

This configuration of the compartments allows for the battery pack to be directly connected to electric circuitry of the propulsion module. Directly connected is intended to mean a connection without any wiring extending inside the body of the surfboard.

Preferred embodiments appear in the dependent claims and in the description.

The upper compartment and the lower compartment partly may overlap each other as seen along a height direction extending between the upper surface and the bottom surface of the surfboard.

The battery pack may be directly connected to electric circuitry of the propulsion module.

The propulsion module may be provided with an electrical connector provided in and fixed relative to an upper wall of the propulsion module, the electrical connector being configured to be directly connected to the battery pack.

The battery pack may be provided with an electrical connector provided in and fixed relative to a lower wall of the battery pack.

The jet-propulsion module may comprise a jet-box forming circumferential walls of a water channel, a directly attachable electric motor and a directly mountable electronic drive module comprising circuitry for controlling the electric motor. A drive shaft from the electric motor may extend in rearward direction through a wall of the water channel and along and inside a rear portion of the water channel.

The jet-box may be made of heat-conducting material, such as aluminum, allowing heat to be transferred out to the surrounding water.

An impeller, a stator and a jet-cone may be mounted rearward of the jet-box.

The stator and the impeller may be dismountable in a rearward direction.

The battery pack may be a replaceable and rechargeable water tight pack.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figure 1:
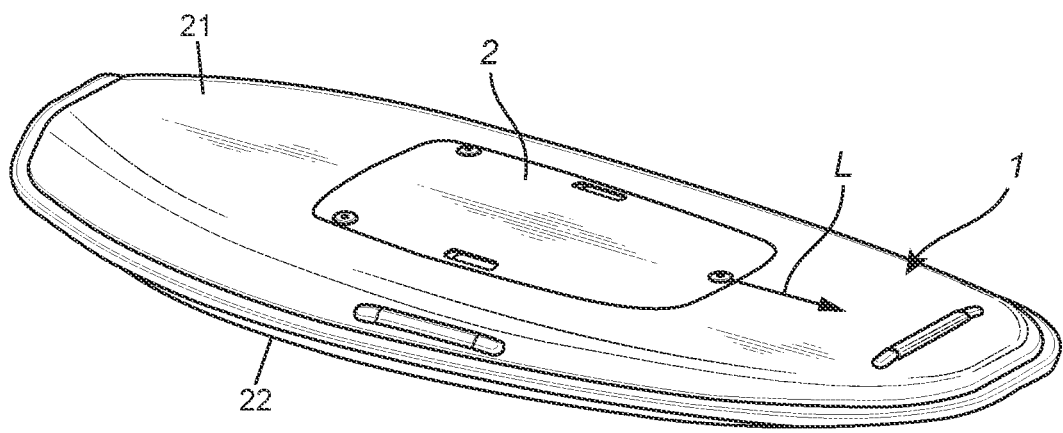
FIG. 1 is a perspective view of a surfboard.
Figure 2:
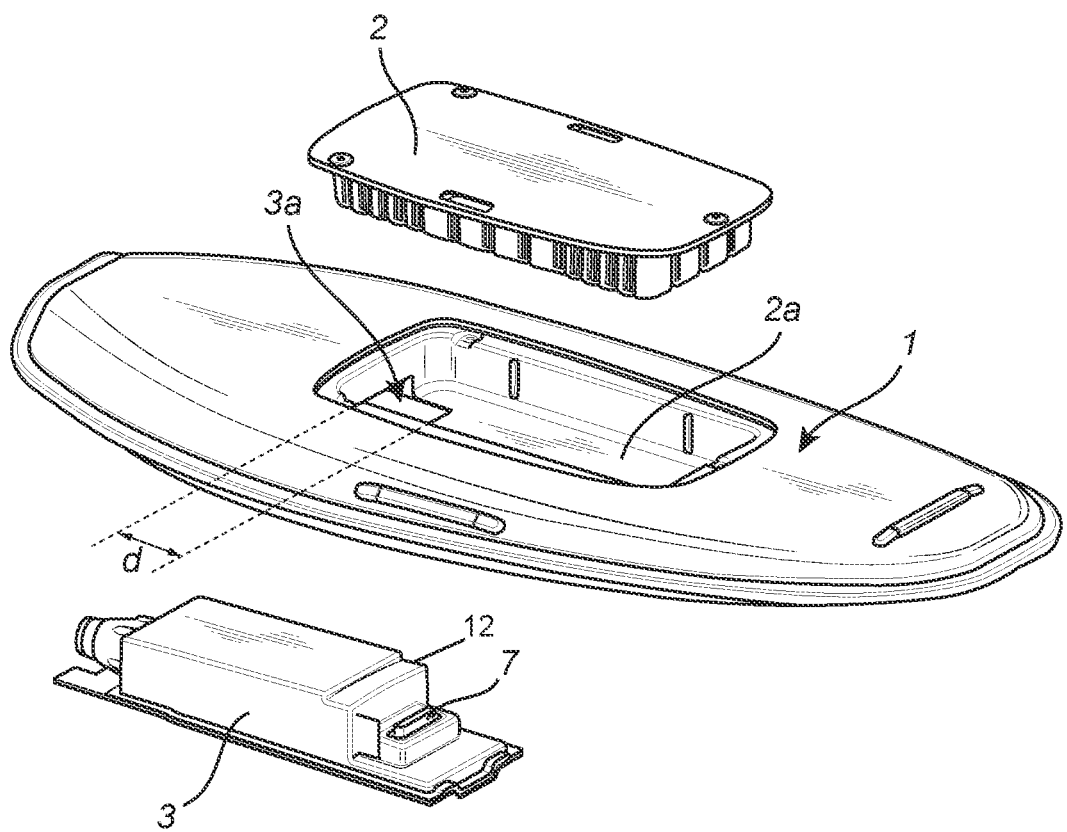
FIG. 2 is an exploded view of the surfboard of FIG. 1.
Figure 2B:
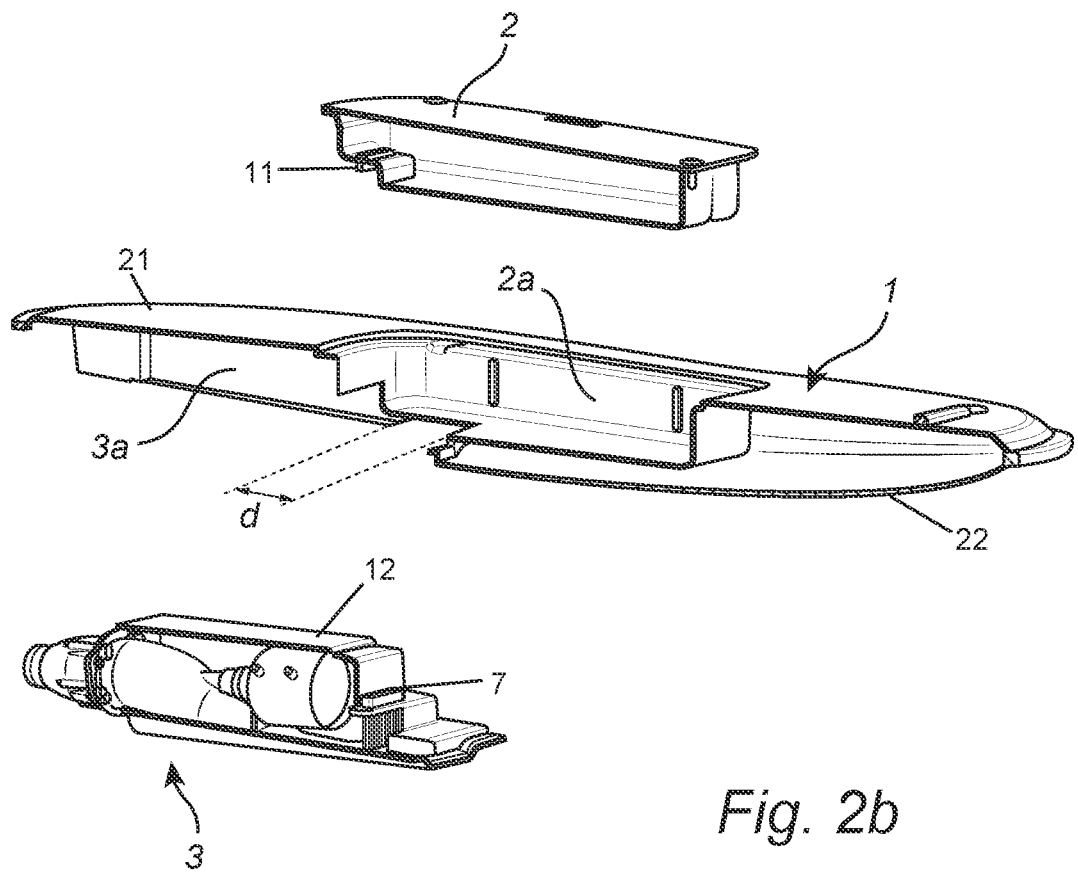
FIG. 2b is a cross-sectional view basically corresponding to FIG. 2.
Figure 3:
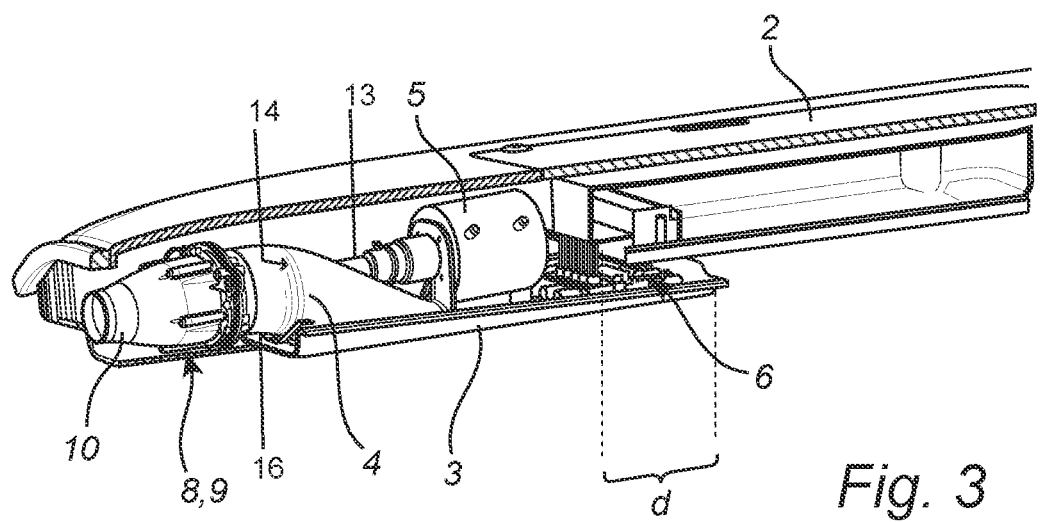
FIG. 3 is a cross-sectional view of the surfboard of FIGS. 1 and 2.

The present disclosure generally relates to modularisation of an electrically powered surf-board. In short the complete surf-board comprises a surfboard body 1, a battery pack 2, and a jet-propulsion module 3.

The surfboard body 1 is made of light-weight material. In a preferred embodiment the surfboard body 1 is made with a sandwiched design with a durable top and bottom shell, filled with a lightweight foam. Other designs of the actual surfboard body could also be possible.

In more detail, the surfboard comprises
a surfboard body 1 extending along a longitudinal direction L and having an upper surface 21 and a bottom surface 22,
an electrical battery pack 2 being removably positioned in an upper compartment 2a accessible from the upper surface 21, and
an electrically driven water-jet configured to propel the surfboard and being provided with electrical power from the electrical battery pack 2, wherein the electrically driven water-jet is provided in a propulsion module 3 being removably positioned in a lower compartment 3a accessible from the bottom surface 22,
wherein the upper compartment 2a and the lower compartment 3a partly overlaps each other a distance d as seen along the longitudinal direction L.

In the preferred embodiment, the upper compartment 2a is, apart from the overlap, positioned in front of the lower compartment 3a.

The battery or battery pack 2 is a replaceable & re-chargeable water-tight pack that allows changing the battery even in wet conditions. The battery pack is mounted in the board and the first battery connector 11 connects directly to the propulsion module 3 without any wiring between them. This may also be said to be an electrical surfboard 1 arranged with overlapping modules 2 and 3 such that electrical cables within the surfboard 1 can be excluded.

The jet-propulsion module 3 comprises a jet-box 4, a directly attachable electric motor 5 and a directly mountable electronic drive module 6 and a second battery connector 7 that exits upwards through the board without any wiring inside the actual board body 1. The propulsion module 3 has a second battery connector 7 provided on and fixed relative to the rear portion of an upper wall 12 of the propulsion module 3. This allows for a number of advantages relating to simplified and cost-reduced manufacturing process, as well as simplified fault-finding and service/replacement of the jet module.

The jet-propulsion module 3 may comprise a jet-box 4 forming circumferential walls 16 of a water channel 14, a directly attachable electric motor 5 and a directly mountable electronic drive module 6 comprising circuitry for controlling the electric motor 5. A drive shaft 13 from the electric motor 5 extends in rearward direction through a wall of the water channel 14 and along and inside a rear portion of the water channel.

Further, the jet-box 4 is made of heat-conducting material such as aluminum that efficiently allows the heat loss created in the electric motor 5, the drive module 6 and the second battery connector 7 to be transferred out to the surrounding water.

This arrangement of an integrated & supporting jet-box module gives several benefits not only for heat conduction but also allows easy pre-production of complete finished modules 3 as well as easy service & module replacement in the field, without the need for skilled service engineers.

It also enables low-lead time production advantages where several versions of the complete boards can be assembled with pre-produced modules according to specific customer orders without the need of having to build each unique order from scratch.

Further, a plurality of board designs can through this modularisation easily be sourced from various suppliers.

Rear of the jet-box 4, the impeller 8, the stator 9 and the jet-cone 10 is mounted. This arrangement is made such that e.g. a damaged impeller can easily be replaced simply by removing the stator & impeller package, without having to remove the entire jet-box.

It is contemplated that there are numerous modifications of the embodiments described herein, which are still within the scope of the invention as defined by the appended claims.

The battery packs may for instance be mounted from the rear of board, in a compartment having a mouth through a rear surface of the surfboard body and/or a mouth through the upper surface, while still avoiding need of wiring inside the surfboard body.

The invention claimed is:

1. Surfboard comprising
a surfboard body extending along a longitudinal direction and having an upper surface and a bottom surface,
an electrical battery pack being removably positioned in an upper compartment accessible from the upper surface, and
an electrically driven water-jet configured to propel the surfboard and being provided with electrical power from the electrical battery pack, wherein the electrically driven water-jet is provided in a propulsion module being removably positioned in a lower compartment accessible from the bottom surface,
wherein the upper compartment and the lower compartment partly overlap each other a distance as seen along the longitudinal direction.

2. Surfboard according to claim 1, wherein the upper compartment and the lower compartment partly overlap each other as seen along a height direction extending between the upper surface and the bottom surface of the surfboard.

3. Surfboard according to claim 1, wherein the battery pack is directly connected to an electronic drive module of the propulsion module.

4. Surfboard according to claim 1, wherein the propulsion module is provided with a second battery connector provided in and fixed relative to an upper wall of the propulsion module, the second battery connector being configured to be directly connected to the electrical battery pack.

5. Surfboard according to claim 1, wherein the battery pack is provided with a first battery connector provided in and fixed relative to a lower wall of the battery pack.

6. Surfboard according to claim 1, wherein the jet-propulsion module comprises a jet-box forming circumferential walls of a water channel, a directly attachable electric motor and an electronic drive module comprising circuitry for controlling the electric motor, wherein a drive shaft from the electric motor extends in rearward direction through a wall of the water channel and along and inside a rear portion of the water channel.

7. Surfboard according to claim 6, wherein the jet-box is made of heat-conducting material allowing heat to be transferred out away from the jet-box.

8. Surfboard according to claim 6, wherein an impeller, a stator and a jet-cone is mounted rearward of the jet-box.

9. Surfboard according to claim 8, wherein the stator and the impeller are dismountable in a rearward direction.

10. Surfboard according to claim 1, wherein the electrical battery pack is a replaceable and rechargeable water tight pack.

11. Surfboard according to claim 2, wherein the electrical battery pack is directly connected to an electronic drive module of the propulsion module.

12. Surfboard according to claim 2, wherein the propulsion module is provided with a second battery connector provided in and fixed relative to an upper wall of the propulsion module, the second battery connector being configured to be directly connected to the electrical battery pack.

13. Surfboard according to claim 2, wherein the electrical battery pack is provided with a first battery connector provided in and fixed relative to a lower wall of the electrical battery pack.

14. Surfboard according to claim 11, wherein the propulsion module is provided with a second battery connector provided in and fixed relative to an upper wall of the propulsion module, the electrical connector being configured to be directly connected to the electrical battery pack.

15. Surfboard according to claim 11, wherein the electrical battery pack is provided with a first battery connector provided in and fixed relative to a lower wall of the electrical battery pack.

16. Surfboard according to claim 14, wherein the electrical battery pack is provided with a first battery connector provided in and fixed relative to a lower wall of the electrical battery pack.

* * * * *

(12) EX PARTE REEXAMINATION CERTIFICATE (12385th)
United States Patent
Lind et al.

(10) Number: US 10,981,633 C1
(45) Certificate Issued: Sep. 1, 2023

(54) ELECTRICALLY POWERED, WATER-JET PROPELLED SURFBOARD

(71) Applicant: Radinn AB, Malmö (SE)

(72) Inventors: Alexander Lind, Malmö (SE); Esbjörn Beckmann, Malmö (SE); Philip Sveningsson, Höllviken (SE)

(73) Assignee: RADINN AB, Malmö (SE)

Reexamination Request:
No. 90/015,088, Aug. 9, 2022

Reexamination Certificate for:
Patent No.: 10,981,633
Issued: Apr. 20, 2021
Appl. No.: 16/478,698
PCT Filed: Dec. 10, 2018
PCT No.: PCT/SE2018/051262
§ 371 (c)(1),
(2) Date: Jul. 17, 2019
PCT Pub. No.: WO2019/143276
PCT Pub. Date: Jul. 25, 2019

(51) Int. Cl.
*B63H 21/17* (2006.01)
*B63B 32/10* (2020.01)
*B63B 32/40* (2020.01)

(52) U.S. Cl.
CPC .............. *B63B 32/40* (2020.02); *B63B 32/10* (2020.02)

(58) Field of Classification Search
None
See application file for complete search history.

(56) References Cited

To view the complete listing of prior art documents cited during the proceeding for Reexamination Control Number 90/015,088, please refer to the USPTO's Patent Electronic System.

*Primary Examiner* — Catherine S Williams

(57) ABSTRACT

A surfboard with a surfboard body (1) extending along a longitudinal direction (L) and having an upper surface and a bottom surface. An electrical battery pack (2) is removably positioned in an upper compartment accessible from the upper surface. An electrically driven water-jet configured to propel the surfboard is provided with electrical power from the electrical battery pack. The electrically driven water-jet is provided in a propulsion module (3) that is removably positioned in a lower compartment accessible from the lower surface. The upper compartment and the lower compartment partly overlaps each other as seen along the longitudinal direction (L).

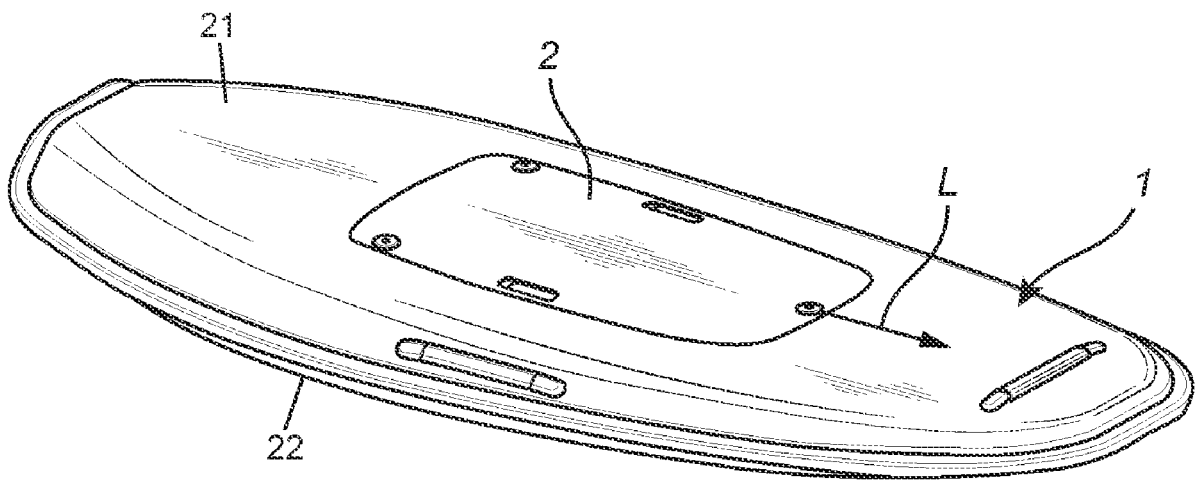

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6 and 8-9 are cancelled.

Claims 1 and 7 are determined to be patentable as amended.

Claims 2-5 and 10-16, dependent on an amended claim, are determined to be patentable.

New claims 17-19 are added and determined to be patentable.

1. Surfboard comprising:
a surfboard body extending along a longitudinal direction and having an upper surface and a bottom surface, an electrical battery pack being removably positioned in an upper compartment accessible from the upper surface, and an electrically driven water-jet configured to propel the surfboard and being provided with electrical power from the electrical battery pack, wherein the electrically driven water-jet is provided in a propulsion module being removably positioned in a lower compartment accessible from the bottom surface, wherein the upper compartment and the lower compartment partly overlap each other a distance as seen along the longitudinal direction, *wherein the jet-propulsion module comprises a jet-box forming circumferential walls of a water channel, a directly attachable electric motor and an electronic drive module comprising circuitry for controlling the electric motor, wherein a drive shaft from the electric motor extends in rearward direction through a wall of the water channel and along and inside a rear portion of the water channel, wherein an impeller, a stator and a jet-cone are mounted rearward of the jet-box, wherein the stator and the impeller are dismountable in a rearward direction*.

7. Surfboard according to claim [6] *1*, wherein the jet-box is made of heat-conducting material allowing heat to be transferred out away from the jet-box.

*17. Surfboard comprising: a surfboard body extending along a longitudinal direction and having an upper surface and a bottom surface, an electrical battery pack being removably positioned in an upper compartment accessible from the upper surface, and an electrically driven water-jet configured to propel the surfboard and being provided with electrical power from the electrical battery pack, wherein the electrically driven water-jet is provided in a propulsion module being removably positioned in a lower compartment accessible from the bottom surface, wherein the upper compartment and the lower compartment partly overlap each other a distance as seen along the longitudinal direction, wherein the upper compartment and the lower compartment partly overlap each other as seen along a height direction extending between the upper surface and the bottom surface of the surfboard, wherein the battery pack is directly connected to an electronic drive module of the propulsion module, wherein the jet-propulsion module comprises a jet-box forming circumferential walls of a water channel, a directly attachable electric motor and an electronic drive module comprising circuitry for controlling the electric motor, wherein a drive shaft from the electric motor extends in rearward direction through a wall of the water channel and along and inside a rear portion of the water channel, wherein an impeller, a stator and a jet-cone is mounted rearward of the jet-box, wherein the stator and the impeller are dismountable in a rearward direction, wherein the electrical battery pack is a replaceable and rechargeable water tight pack, wherein the electrical battery pack is provided with a first battery connector provided in and fixed relative to a lower wall of the electrical battery pack, wherein the propulsion module is provided with a second battery connector provided in and fixed relative to an upper wall of the propulsion module, the electrical connector being configured to be directly connected to the electrical battery pack.*

*18. Surfboard comprising: a surfboard body extending along a longitudinal direction and having an upper surface and a bottom surface, an electrical battery pack being removably positioned in an upper compartment accessible from the upper surface, and an electrically driven water-jet configured to propel the surfboard and being provided with electrical power from the electrical battery pack, wherein the electrically driven water-jet is provided in a propulsion module being removably positioned in a lower compartment accessible from the bottom surface, wherein the upper compartment and the lower compartment partly overlap each other a distance as seen along the longitudinal direction, wherein the jet-propulsion module comprises a jet-box forming circumferential walls of a water channel, a directly connectable electric motor and an electronic drive module comprising circuitry for controlling the electric motor, wherein a drive shaft from the electric motor extends in rearward direction through a wall of the water channel and along and inside a rear portion of the water channel, wherein an impeller, a stator and a jet-cone are mounted rearward of the jet-box, wherein the stator and the impeller are dismountable in a rearward direction.*

*19. Surfboard comprising: a surfboard body extending along a longitudinal direction and having an upper surface and a bottom surface, an electrical battery pack being removably positioned in an upper compartment accessible from the upper surface, and an electrically driven water-jet configured to propel the surfboard and being provided with electrical power from the electrical battery pack, wherein the electrically driven water-jet is provided in a propulsion module being removably positioned in a lower compartment accessible from the bottom surface, wherein the upper compartment and the lower compartment partly overlap each other a distance as seen along the longitudinal direction, wherein the upper compartment and the lower compartment partly overlap each other as seen along a height direction extending between the upper surface and the bottom surface of the surfboard, wherein the battery pack is directly connected to an electronic drive module of the propulsion module, wherein the jet-propulsion module comprises a jet-box forming circumferential walls of a water channel, an electric motor and an electronic drive module comprising circuitry for controlling the electric motor, wherein a drive shaft from the electric motor extends in rearward direction through a wall of the water channel and along and inside a rear portion of the water channel, wherein an impeller, a stator and a jet-cone is mounted rearward of the jet-box, wherein the stator and the impeller are dismountable in a rearward direction, wherein the*

*electrical battery pack is a replaceable and rechargeable water tight pack, wherein the electrical battery pack is provided with a first battery connector provided in and fixed relative to a lower wall of the electrical battery pack, wherein the propulsion module is provided with a second battery connector provided in and fixed relative to an upper wall of the propulsion module, the electrical connector being configured to be directly connected to the electrical battery pack.*

\* \* \* \* \*